Dec. 15, 1959   E. A. CARLSON ET AL   2,916,951
HYDRAULIC MECHANISM FOR RETRACTING DIAMOND BORING TOOL
Filed Jan. 28, 1957   2 Sheets-Sheet 1
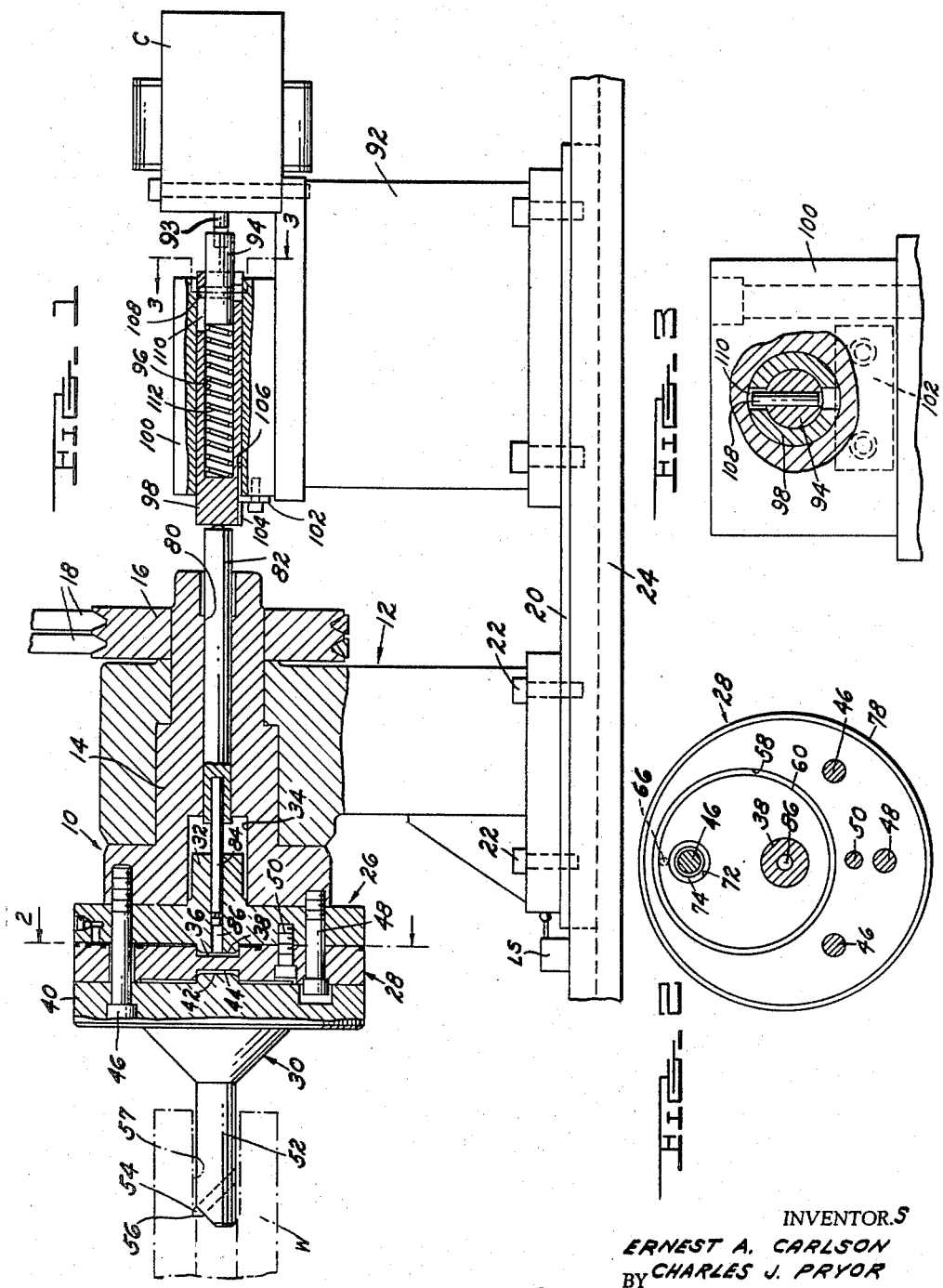
INVENTORS
ERNEST A. CARLSON
BY CHARLES J. PRYOR
ATTORNEYS

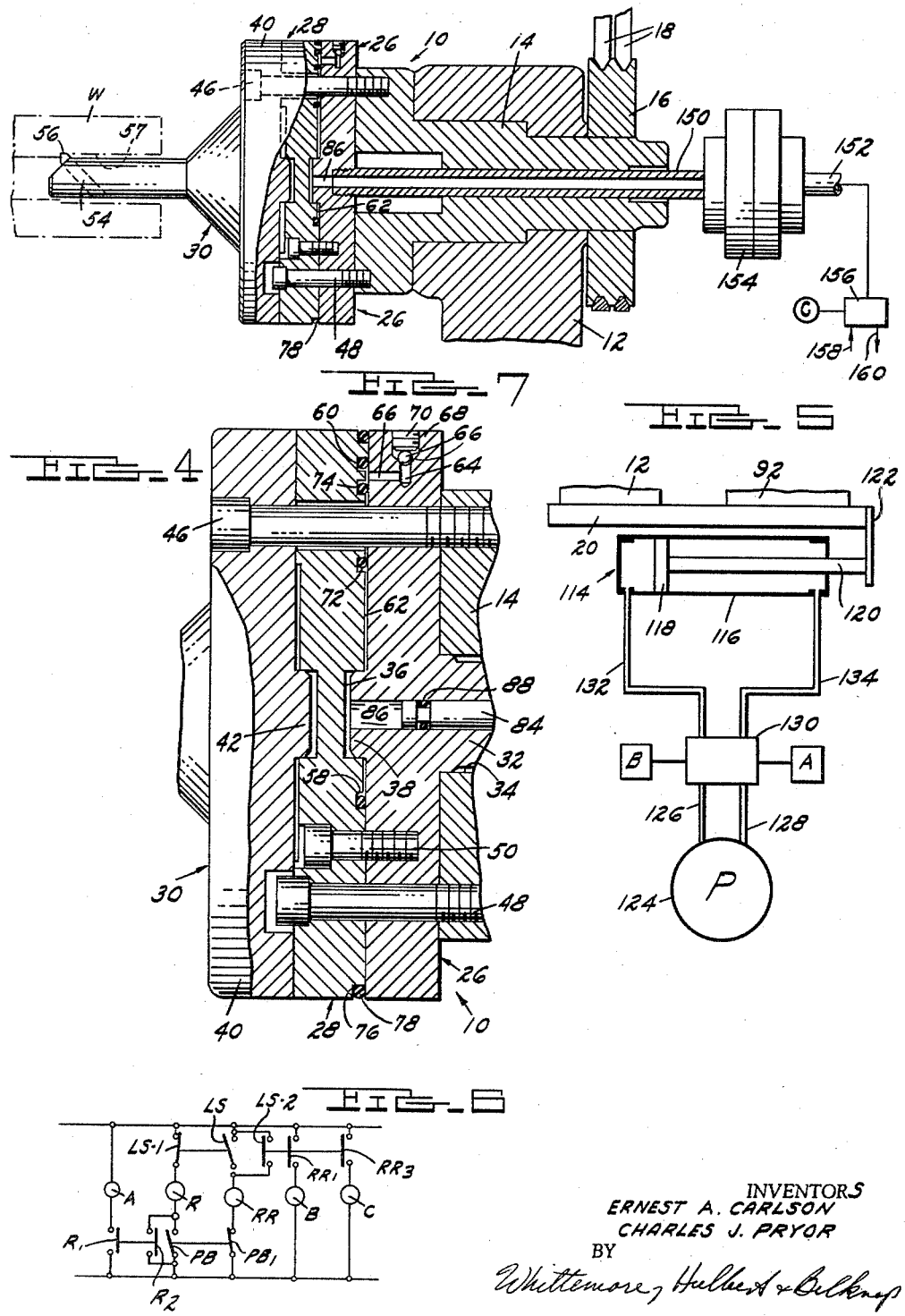

United States Patent Office 2,916,951
Patented Dec. 15, 1959

2,916,951

HYDRAULIC MECHANISM FOR RETRACTING DIAMOND BORING TOOL

Ernest A. Carlson, Southfield Township, Oakland County, and Charles J. Pryor, Clawson, Mich., assignors to The Olofsson Corporation, Detroit, Mich., a corporation of Michigan Application January 28, 1957, Serial No. 636,794

12 Claims. (Cl. 77—3)

This invention relates to boring apparatus and refers more particularly to hydraulic mechanism for retracting a diamond boring tool.

In apparatus of this kind, particularly for finish boring, the boring tool is advanced into the hole and, at the completion of the forward boring stroke, the tool is withdrawn. One object of this invention is to provide boring apparatus so constructed and arranged as to enable withdrawal of the boring tool from the hole following the boring operation without marring the bored hole.

Another object of the invention is to provide boring apparatus as described above having hydraulic mechanism for retracting the boring tool radially inwardly relative to the axis of rotation thereof to clear the bore during the withdrawal of the boring tool from the hole.

Still another object is to provide boring apparatus having first and second spindle portions bolted together, and a boring tool carried by the second spindle portion at one side of the axis of rotation of the spindle for engagement with a bore. The spindle portions cooperate to define a chamber therebetween for hydraulic fluid eccentric to the axis of rotation of the spindle at the same side of the axis of rotation as the boring tool, and hydraulic fluid pressure means are provided for placing hydraulic fluid in the chamber under pressure to rock or tilt the second spindle portion slightly relative to the first spindle portion to retract the boring tool radially inwardly toward the axis of rotation to permit withdrawal of the boring tool from a bore free of engagement therewith. The bolts connecting the spindle portions are sufficiently yieldable and resilient to permit such rocking or tilting movement of the second spindle portion.

Other objects and features of the invention will become apparent as the description proceeds, especially when taken in conjunction with the accompanying drawings, illustrating preferred embodiments of the invention wherein:

Fig. 1 is a side elevational view, partly in section, of boring apparatus constructed in accordance with the invention.

Fig. 2 is a sectional view taken along the line 2—2 on Fig. 1.

Fig. 3 is a sectional view taken along the line 3—3 on Fig. 1.

Fig. 4 is an enlarged fragmentary view of a portion of the structure shown in Fig. 1.

Fig. 5 is a diagrammatic view illustrating hydraulic mechanism for operating the apparatus.

Fig. 6 illustrates a wiring diagram.

Fig. 7 is similar to Fig. 1 and shows a modification.

Referring now more particularly to the drawings and especially to Figs. 1–6, the boring apparatus comprises a spindle 10 and a spindle support 12. The spindle 10 includes a main body portion 14 rotatably supported in and extending through the spindle support 12. A pulley 16 is secured on the rear end of the main body portion 14 and is grooved about its periphery for the reception of belts 18 for driving the pulley and hence the spindle by any suitable source of power not shown.

The spindle support 12 is mounted on a table 20 by bolts 22, and the table is slidable in forward and rearward directions, that is to the left and right as viewed in Fig. 1, on the table support 24.

The spindle 10 also includes an adapter plate 26, a retract plate 28 and a quill 30. The adapter plate 26 is circular and has a rearwardly projecting boss 32 which extends into the enlarged cylindrical portion 34 of an axial passage along the spindle axis of rotation through the main body portion 14. The retract plate 28 is also circular and has a central recess 36 in its rear face for receiving a central pilot 38 on the front face of the adapter plate. The quill has a circular flange portion 40 at the rear formed with a central pilot 42 on its rear face and received in a central recess in the front face of the retract plate 28. Three standard alloy steel bolts 46 are provided for clamping together the flange portion 40, the retract plate 28 and the adapter plate 26 and for clamping them firmly to the main body portion 14 of the spindle. Another bolt 48 is provided for clamping the plates 26 and 28 to the main body portion of the spindle and still another bolt 50 is provided for clamping together the plates 26 and 28.

The quill 30 has a forwardly projecting portion 52 which is concentric with the axis of rotation of the spindle. The portion 52 of the quill has an oblique passage adjacent its front end in which is secured a boring tool 54. The boring tool 54 is in the form of an elongated diamond or carbide tool and is disposed in a plane through the axis of rotation of the spindle. The radially outer tip 56 of the boring tool is adapted to engage the bore 57 in a workpiece W in a finish boring operation.

The retract plate 28 is formed with an eccentric groove 58, and an O-ring 60 is supported within this groove for sealing engagement with the bottom of the groove and the adapter plate. The rear surface of the adapter plate 28 within the groove 58 is relieved slightly (see Fig. 4) to provide an eccentric chamber 62 defined by the adjacent surfaces of the plates 26 and 28 within the circular recess 58. The adapter plate 26 is formed with the radial passage 64 which connects into a forwardly extending passage 66 communicating with the chamber 62. The radial passage 64 is shaped to provide a valve seat 66 normally closed by a ball valve 8. The ball valve is held against its seat by a removable threaded plug 70. The passages 64 and 66 provide a means for filling the chamber 62 with hydraulic fluid. During operation, the chamber is completely filled with hydraulic fluid.

The retract plate is formed with a second circular recess 72 surrounding one of the bolts 46 within groove 58, and an O-ring seal 74 in this recess sealingly engages the adapter plate 26 and the bottom of the groove to prevent hydraulic fluid in chamber 62 from passing radially inwardly to the circular space defined within recess 72. The retract plate is formed with a third circular recess 76 about its periphery, and an O-ring seal 78 in this recess engages the adapter plate 26 and the bottom of the recess throughout its full extent.

The axial passage in the main body portion 14 of the spindle has an intermediate reduced cylindrical portion 80, and a push rod 82 is axially slidable within this portion of the passage. A piston 84 is secured to the front end of the push rod and extends into an axial through passage 86 in the adapter plate. An O-ring seal 88 is supported on the piston in a recess adjacent to its forward end. Since the pilot 38 has a loose fit in the recess 36 of the retract plate, the chamber 62 and the hydraulic fluid therein communicates directly with the portion of the passage 86 at the front side of piston 84.

A solenoid C is mounted on a support 92 bolted to the table 20. The solenoid is arranged so that its core 93 is disposed on the axis of rotation of the spindle and is shown in solid lines in Fig. 1 in its normal retracted position when the solenoid is not energized. Suitable spring means may be provided for retracting the solenoid core. The solenoid core is engageable with a pin 94 which is slidable within the bore 96 of a plunger 98. The plunger 98 is slidable along the axis of rotation of the spindle in a tubular housing 100 secured to the support 92. The limit of forward movement of the plunger 98 is determined by a stop plate 102 secured to the housing 100 and extending into an axial slot 104 in the bottom of the cylinder. The rear end 106 of the slot determines the limit of forward movement of the cylinder. The pin 94 carries a transverse stop pin 108 which extends into a longitudinal slot 110 in the cylinder to determine the limits of forward and rearward movement of the pin relative to the plunger. A compression coil spring 112 is supported within the plunger 98 having one end bearing against the bottom of the bore therein and the other end against the pin 94.

Referring to Fig. 5, the table 20 is reciprocated forwardly and rearwardly by a hydraulic piston cylinder assembly 114 which includes a cylinder 116 having a piston 118 reciprocable therein. The piston rod 120 is connected to the table by a bracket 122. The hydraulic pump 124 has a pressure line 126 and a return line 128 which lead to a 4-way valve 130 controlled by solenoids A and B. The fluid lines 132 and 134 lead from the valve 130 to opposite ends of cylinder 116.

A manual, normally open push button PB is provided for advancing the spindle in a forward direction, and a limit switch LS is provided for determining the limit of forward movement of the spindle and also for returning the spindle rearwardly to withdraw the boring tool from the workpiece.

The operation will be described along with a description of the wiring diagram in Fig. 6. Assuming that a workpiece W is supported substantially as shown having its bore 57 arranged concentric with the axis of rotation of the spindle, the table may be moved forwardly by momentarily depressing the push button PB. This will result in energizing the relay R closing contact r1 and energizing the solenoid A. Energization of solenoid A will shift the valve 130 to a position in which high pressure fluid from the pump is directed to the rear end of cylinder 116 through hydraulic line 134 to advance the table. Line 132 is connected to the return line to the pump through valve 130. The relay contact r2 is also closed to seal in the relay R after the push button PB is released.

When the table reaches the forward position illustrated in Fig. 1, it will engage the limit switch LS to close the latter, thereby energizing relay RR. The closing of limit switch LS will open the switch LS-1 which is mechanically connected to limit switch LS, thereby de-energizing relay R and in turn solenoid A. The contacts rr1, rr2 and rr3 of the relay RR are closed to seal in the relay RR and to energize solenoids B and C. Energization of solenoid B is effective to shift the valve 130 to a position directing fluid under pressure from the pump to hydraulic line 132 and opening the hydraulic line 134 to exhaust to accomplish the rearward movement of the spindle. The solenoid C, being energized simultaneously with the solenoid B, serves to urge the solenoid core 93 to the left in Fig. 1 to the dotted line position, thereby moving the pin 94 to the left and applying pressure upon the push rod 82 and piston 84 through the spring 112 and plunger 98. The forward movement of the piston 84 will result in placing the hydraulic fluid in chamber 62 under pressure tending to separate the adapter plate and retract plates 26 and 28. Since the chamber 62 is eccentric to the axis of rotation of the spindle and at the same side thereof as the tip 56 of the boring tool 54, the hydraulic fluid under pressure will slightly rock or tilt the retract plate 28 relative to the adapter plate 26 about an axis which, in Fig. 1, extends horizontally and transversely of the axis of rotation of the spindle. Although the bolts 46 are of standard alloy steel construction, they are sufficiently yieldable and resilient to permit this slight rocking or tilting of the retract plate and hence of the quill. Pressures in the chamber 62 will attain a value on the order of 200 p.s.i. The spring 112 is designed to transmit a force from the solenoid core 93 to the piston 84 of a magnitude sufficient to develop such pressures in the chamber 62.

The solenoid B is of the slow acting type whereas solenoid C is quick acting so that the pressure of the hydraulic fluid in chamber 62 is pressurized to tilt or rock the retract plate and quill prior to the initial withdrawal or rearward movement of the table. The quill will be rocked sufficiently to withdraw the boring tool radially inwardly toward the axis of rotation of the spindle and to clear the bore so that it remains out of engagement therewith during the rearward movement of the spindle. In the rearwardmost position of the spindle, determined by a suitable stop engageable with the table, the boring tool is fully retracted from the bore of the workpiece.

In actual practice, it is necessary only that the tip of the boring tool be retracted one thousandth of an inch more or less.

When it is desired to again advance the spindle in a forward direction, the push button PB is closed to again energize solenoid A. Prior to the closing of push button PB, the switch PB-1, which is mechanically connected to the push button PB, opens the circuit to relay RR to de-energize solenoids B and C.

Fig. 7 illustrates a modification in which a pipe 150 is threaded into the passage 86 in the adapter plate 26, the pipe extending through the axial passage in the main body portion of the spindle. The pipe 150 rotates with the spindle and is connected to a non-rotating pipe 152 by a rotating coupling 154. A 3-way valve 156 alternately connects the pipe 152 to hydraulic fluid under pressure from line 158 and exhaust through line 160. The line 158 is connected to any suitable hydraulic fluid pressure source. The 3-way valve 156 is controlled by a solenoid C which is effective when energized to connect pipe 152 to the pressure line 158. When deenergized, the solenoid C is returned by a spring (not shown) to adjust the valve so as to connect pipe 152 to exhaust. Otherwise the structure is the same as that shown in Figs. 1–4 and so the same reference numbers are employed.

The operation of the structure shown in Fig. 7 is substantially the same as that shown in Figs. 1–4. That is, the hydraulic mechanism shown in Fig. 5 is employed for advancing and returning the spindle and the electrical wiring of Fig. 6 is provided for controlling the advance and return of the spindle and also the energization of solenoid C.

In both constructions, a longitudinal or axial plane through the axis of rotation of the spindle and the boring tool tip passes through the center of the eccentric chamber 62 so that the axis which the quill is tilted is normal to that plane.

The drawings and the foregoing specification constitute a description of the improved hydraulic mechanism for retracting diamond boring tool in such full, clear, concise and exact terms as to enable any person skilled in the art to practice the invention, the scope of which is indicated by the appended claims.

What we claim as our invention is:

1. Boring apparatus comprising a rotatable spindle having an axially inner main spindle portion and an axially outer tool carrying spindle portion, a boring tool on said tool carrying portion, said spindle portions being aligned and arranged end to end, said main spindle portion having at its outer end a surface transverse to the axis of rotation of said spindle and said tool carrying spindle portion having at its inner end a surface transverse to said axis of rotation in opposed, confronting relation to said surface of said main spindle portion, said tool carrying spindle portion being tiltable relative to said main spindle portion about an axis transverse to said axis of rotation of said spindle to displace said boring tool radially relative to said axis of rotation, means connecting said spindle portions together and yieldably opposing such relative tilting movement thereof, said surfaces cooperating to define a fluid chamber therebetween, means for tilting said tool carrying portion relative to said main spindle portion as aforesaid including said fluid chamber, and means for placing fluid in said chamber under a pressure sufficient to overcome the connecting means and effect the aforesaid tilting movement of said tool carrying portion and tool relative to said main spindle portion.

2. Boring apparatus comprising a rotatable spindle having a first spindle portion, a second spindle portion at the end of said spindle, means for connecting said spindle portions together, a boring tool carried by said second spindle portion adjacent the free end thereof and at one side of the axis of rotation of said spindle for engagement with the wall of a bore, said spindle portions cooperating to define a chamber therebetween for hydraulic fluid eccentric to the axis if rotation of said spindle at the same side of the axis of rotation of said spindle as said boring tool, and hydraulic fluid pressure means for placing hydraulic fluid in said chamber under pressure to rock said second spindle portion relative to said first spindle portion about an axis extending transversely of the axis of rotation of said spindle in a direction to retract said boring tool radially inwardly toward the axis of rotation of said spindle to permit withdrawal of said boarding tool from a bore free of engagement therewith, said connecting means being sufficiently yieldable and resilient to permit such rocking movement.

3. Boring apparatus as defined in claim 2 in which said fluid pressure means includes a passage in said spindle communicating with said chamber, a piston reciprocable in said passage, means for moving said piston in said passage in a direction to apply pressure upon hydraulic fluid in said chamber, and means for thus moving said piston.

4. Boring apparatus as defined in claim 3 in which said last-named means includes a solenoid operative when energized to move said piston as aforesaid, means for moving said spindle forwardly and rearwardly along the axis of rotation of said spindle toward and away from a forward limiting position, and means for energizing said solenoid at the forward limiting position of said spindle.

5. Boring apparatus comprising a rotatable spindle having a first spindle portion, a second spindle portion at the end of said spindle, bolts for connecting said spindle portions together, a boring tool carried by said second spindle portion adjacent the free end thereof and at one side of the axis of rotation of said spindle for engagement with the wall of a bore, said spindle portions cooperating to define a chamber therebetween for hydraulic fluid eccentric to the axis of rotation of said spindle at the same side of the axis of rotation of said spindle as said boring tool, and hydraulic fluid pressure means for placing hydraulic fluid in said chamber under pressure to rock said second spindle portion relative to said first spindle portion about an axis extending transversely of the axis of rotation of said spindle in a direction to retract said boring tool radially inwardly toward the axis of rotation of said spindle to permit withdrawal of said boring tool from a bore free of engagement therewith, means between said spindle portions for sealing said chamber, said bolts being sufficiently resilient and yieldable to permit such rocking movement, said fluid pressure means including a passage in said spindle communicating with said chamber, a piston in said passage movable in a direction to apply pressure upon hydraulic fluid in said chamber, means for thus moving said piston including a solenoid having a core operative to apply pressure against said piston when said solenoid is energized, spring means between said core and piston to limit the pressure applied on said piston by said core, means for moving said spindle in forward and rearward directions along its axis of rotation toward and away from a forward limiting position, and means for energizing said solenoid at the forward limiting position of said spindle and for simultaneously energizing said spindle moving means to move said spindle in a rearward direction.

6. Boring apparatus as defined in claim 5, said spindle having a filling port communicating with said chamber, and means for closing said port.

7. Boring apparatus as defined in claim 2 in which said fluid pressure means includes a passage in said spindle communicating with said chamber, means for supplying hydraulic fluid under pressure to said chamber through said passage, and means for connecting said last-named means to said passage including a valve.

8. Boring apparatus as defined in claim 7 including means for moving said spindle in forward and rearward directions along its axis of rotation toward and away from a forward limiting position, and means for operating said valve at the forward limiting position of said spindle and simultaneously energizing said spindle moving means to move said spindle in a rearward direction.

9. Boring apparatus as defined in claim 8 in which said last-named connecting means includes a rotating coupling.

10. Boring apparatus comprising a rotatable spindle having a first spindle portion, a second spindle portion at the end of said spindle, means for connecting said spindle portions together, a boring tool carried by said second spindle portion adjacent the free end thereof for engagement with the wall of a bore, said spindle portions cooperating to define a chamber therebetween for fluid eccentric to the axis of rotation of said spindle, and fluid pressure means for placing fluid in said chamber under pressure to rock said second spindle portion relative to said first spindle portion about an axis extending transversely of the axis of rotation of said spindle to move said boring tool radially relative to the axis of rotation of said spindle, said connecting means being sufficiently yieldable and resilient to permit such rocking movement.

11. Boring apparatus comprising a rotatable spindle having a first spindle portion, a second spindle portion at the end of said spindle, means for connecting said spindle portions together, a boring tool carried by said second spindle portion adjacent the free end thereof for engagement with the wall of a bore, said second spindle portion being tiltable relative to said first spindle portion about an axis transversely of the axis of rotation of said spindle to move said tool radially relative to the axis of rotation of said spindle, said spindle portions cooperating to define a chamber therebetween for fluid eccentric to the axis of rotation of said spindle, and fluid pressure means for placing fluid in said chamber under pressure to tilt said second spindle portion relative to said first spindle portion as aforesaid to move said boring tool radially relative to the axis of rotation of said spindle.

12. Boring apparatus comprising a rotatable spindle having a first portion and a second portion, a boring tool carried by said second portion, said second portion being tiltable relative to said first portion about an axis transversely of the axis of rotation of said spindle to move said tool radially relative to the axis of said spindle, means for tilting said second portion relative to said first portion about said first-mentioned axis as aforesaid including a fluid chamber defined by said portions eccentric to the axis of said spindle, and means for placing fluid in said chamber under pressure.

References Cited in the file of this patent

UNITED STATES PATENTS

| | | |
|---|---|---|
| 2,222,313 | Heald | Nov. 19, 1940 |
| 2,237,692 | Stewart | Apr. 8, 1941 |
| 2,286,217 | Martin | June 16, 1942 |
| 2,412,038 | Freisen | Dec. 3, 1946 |